United States Patent
Miller

(10) Patent No.: US 7,590,674 B2
(45) Date of Patent: Sep. 15, 2009

(54) METHOD AND APPARATUS FOR GENERATING A RANDOM BIT STREAM

(75) Inventor: Mark E. Miller, Mission Viejo, CA (US)

(73) Assignee: Conexant Systems, Inc., Newport Beach, CA (US)

(*) Notice: Subject to any disclaimer, the term of this patent is extended or adjusted under 35 U.S.C. 154(b) by 828 days.

(21) Appl. No.: 11/173,329

(22) Filed: Jun. 30, 2005

(65) Prior Publication Data

US 2007/0005671 A1    Jan. 4, 2007

(51) Int. Cl.
    *G06F 7/58* (2006.01)
(52) U.S. Cl. ..................................................... 708/250
(58) Field of Classification Search .......... 708/250–256
    See application file for complete search history.

(56) References Cited

U.S. PATENT DOCUMENTS

| | | | | |
|---|---|---|---|---|
| 5,365,585 A | * | 11/1994 | Puhl et al. | 380/265 |
| 6,014,446 A | * | 1/2000 | Finkelstein | 380/46 |
| 2003/0014451 A1 | * | 1/2003 | Peyser et al. | 708/250 |
| 2008/0298487 A1 | * | 12/2008 | Peron | 375/260 |

* cited by examiner

*Primary Examiner*—Tan V Mai
(74) *Attorney, Agent, or Firm*—Jackson Walker L.L.P.; Christopher J. Rourk

(57) ABSTRACT

Presently disclosed is method and apparatus for generating a random bit stream by generating a random bit according to a polynomial expression, providing a modification function operative on the polynomial expression, and modifying the polynomial expression by modifying the modification function.

20 Claims, 11 Drawing Sheets

METHOD AND APPARATUS FOR GENERATING A RANDOM BIT STREAM

BACKGROUND

Random numbers are used in a variety of application such as computer games. But they are also used in more serious applications, for example in generating cryptographic keys and for some classes of scientific experiments. There are two species of random number generators, namely, software or pseudo random number generators and hardware random number generators. While the former is relatively inexpensive and easy to implement, the latter if properly designed, can provide very close to true randomness, but at a higher cost.

Software random number generators produce random numbers by using mathematical formulas or they are simply taken from a pre-calculated list. Extensive research has been devoted to software random number generators and there are presently algorithms available which are capable of generating random numbers which seem as if they are truly random. However, software random number generators have the characteristic that they are predictable.

Hardware random number generators, on the other hand, can be very close to truly random. They usually come in the form of an electronic device, although a container containing a number of numbered balls, such as that used in a lottery, also constitute a hardware random number generator. Hardware random number generators typically use an entropy source which exhibits randomness. For example, a common hardware random number generator used in a computer uses the random variations in a user's mouse movements or the amount of time between key strokes as an entropy source. Other hardware random number generators include those that use atmospheric noise from a radio and those that use a radioactive source and the points in time at which the radioactive source decays are used to generate random numbers.

There is another class of random number generator which is known as a hybrid random number generator. A hybrid random number generator uses a software algorithm in order to generate a pseudo random number. The output of a hybrid random number generator tends to approach a more random state when the input to the software algorithm is seeded with a random seed value. Such a random seed value is often obtained from a traditional hardware random number generator. As such, the hybrid random number generator is able to provide a much more random output than a true software random number generator.

One problem with either the hardware random number generator or a hybrid random number generator that relies on a hardware random number generator for a seed value is that a hardware random number generator may not always be able to provide a random number. Consider, for example, a hardware random number generator that is based upon the movement of a user's mouse. In the case where a user is not using the mouse, the hardware random number generator no longer has access to an entropy source. The same is true for a number of variations of hardware random number generators. In order to provide a continuous stream of random numbers, a suitable entropy source must be provided and must be readily accessible at any point in time.

SUMMARY

Presently disclosed is method and apparatus for generating a random bit stream by generating a random bit according to a polynomial expression, providing a modification function operative on the polynomial expression, and modifying the polynomial expression by modifying the modification function.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
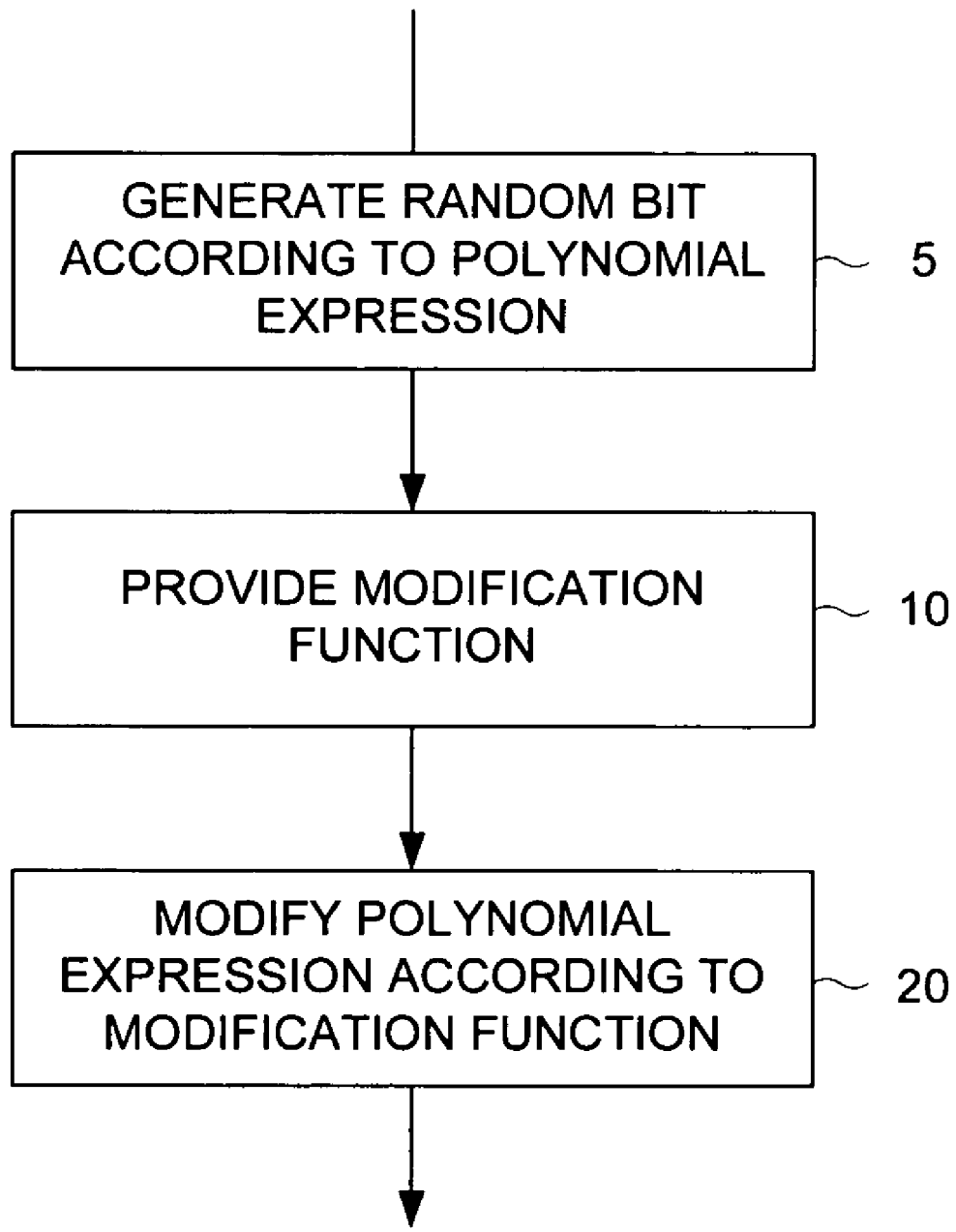
FIG. 1 is a flow diagram that depicts one alternative illustrative method for generating a random bit stream.

FIG. 1 is a flow diagram that depicts one alternative illustrative method for generating a random bit stream. According to this alternative method, a random bit stream is generated by evaluating a polynomial expression to generate a random bit (step 5). Typically an $n^{th}$ order polynomial is used for this purpose. A modification function is then provided (step 10). According to one variation of the present method, a modification function contains a set of coefficients corresponding to the terms of the polynomial expression. The polynomial expression is then modified according to the modification function (step 15). A subsequent random bit is that generated using the modified polynomial expression. By randomly changing the modification function, a high degree of randomness is achieved.

According to one illustrative use case, a random bit generator is based on a linear feedback shift register (LFSR). A linear feedback shift register is structured according to coefficients included in a polynomial expression. According to yet another illustrative use case, the coefficients of the polynomial expression, held in a linear feedback shift register, are modified randomly according to a hardware entropy source. Accordingly, a randomly changing modifying function operative on the coefficients of the polynomial expression produces a series of random bit with each successive modification of the polynomial expression.

Figure 2:
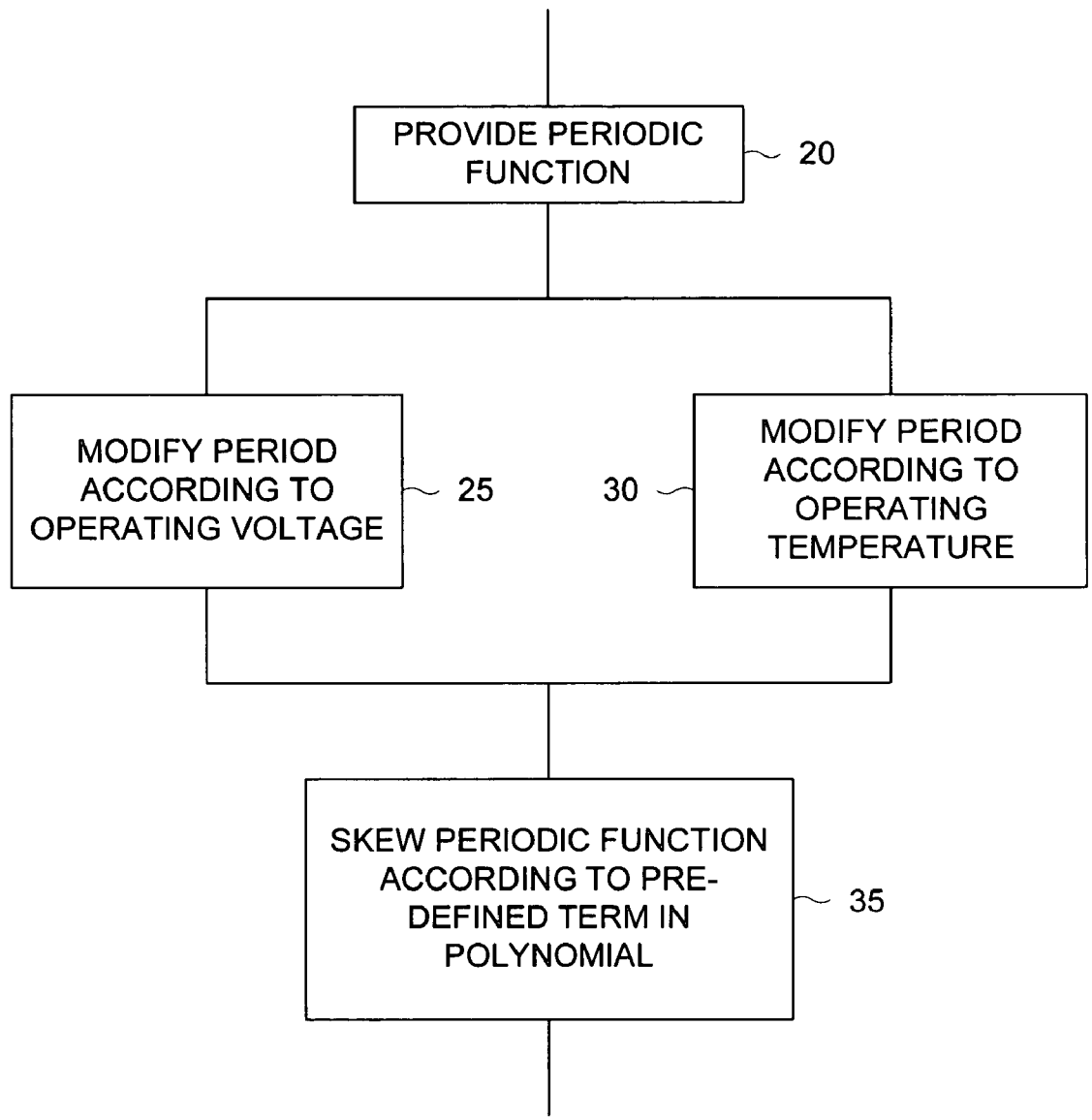
FIG. 2 is a flow diagram that depicts alternative illustrative methods for providing a modification function.

FIG. 2 is a flow diagram that depicts alternative illustrative methods for providing a modification function. According to one variation of the present method, a modification function is provided by providing a periodic function (step 20) and allowing a period exhibited by the periodic function to vary according to an operating voltage (step 25). It should be appreciated that fluctuations in operating voltage can provide entropy, useful in introducing randomness into a modification function used to modify a polynomial expression. According to yet another variation of the present method, a modification function is provided by providing a periodic function (step 20) and allowing a period exhibited by the periodic function to change according to an operating temperature (step 30). According to this variation of the present method, variations in operating temperature serve as an entropy source, which introduces randomness into a modification function provided to modify a polynomial expression.

FIG. 2 further illustrates that, according to another alternative illustrative method, a modification function is provided by further skewing the periodic function according to a predefined term in the polynomial expression (step 35). Skewing the periodic function according to this alternative method introduces a phase perturbation in a periodic function. This exaggerates the entropy exhibited by a periodic function.

Figure 3:
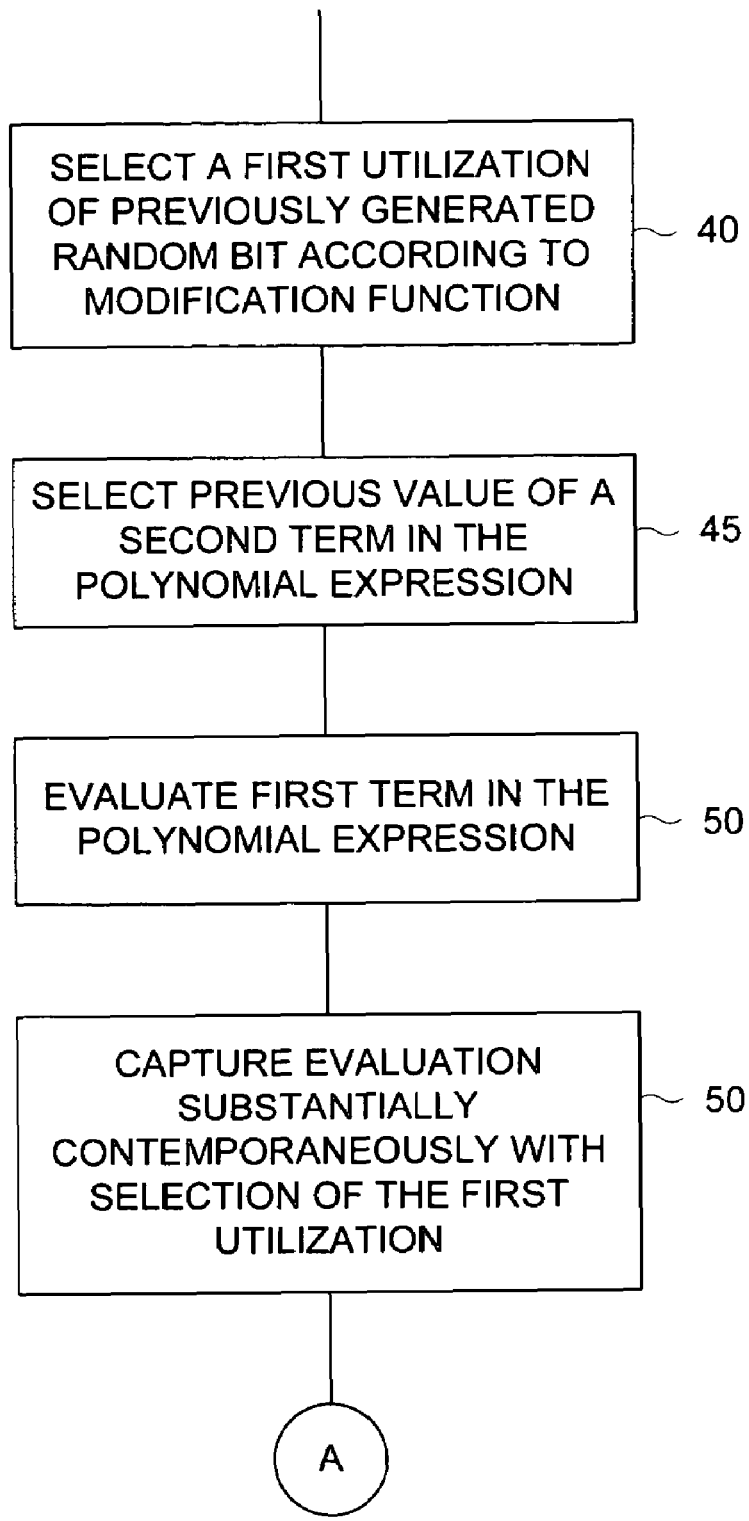
FIG. 3 is a flow diagram that depicts one alternative illustrative method for modifying a polynomial expression according to a first utilization of a previously generated random bit.

FIG. 3 is a flow diagram that depicts one alternative illustrative method for modifying a polynomial expression according to a first utilization of a previously generated random bit. According to this alternative method, a polynomial expression is modified by selecting a first utilization of a previously generated random bit according to a modification function (step 40). A first term in the polynomial expression (step 50) is evaluated according to the first selected utilization and a previous value of a second term in the polynomial expression (step 45). In yet another example variation of the present method, the first evaluated term is captured in a manner that is substantially contemporaneous with the selection of the first utilization of a previously generated random bit (step 55).

Figure 4:
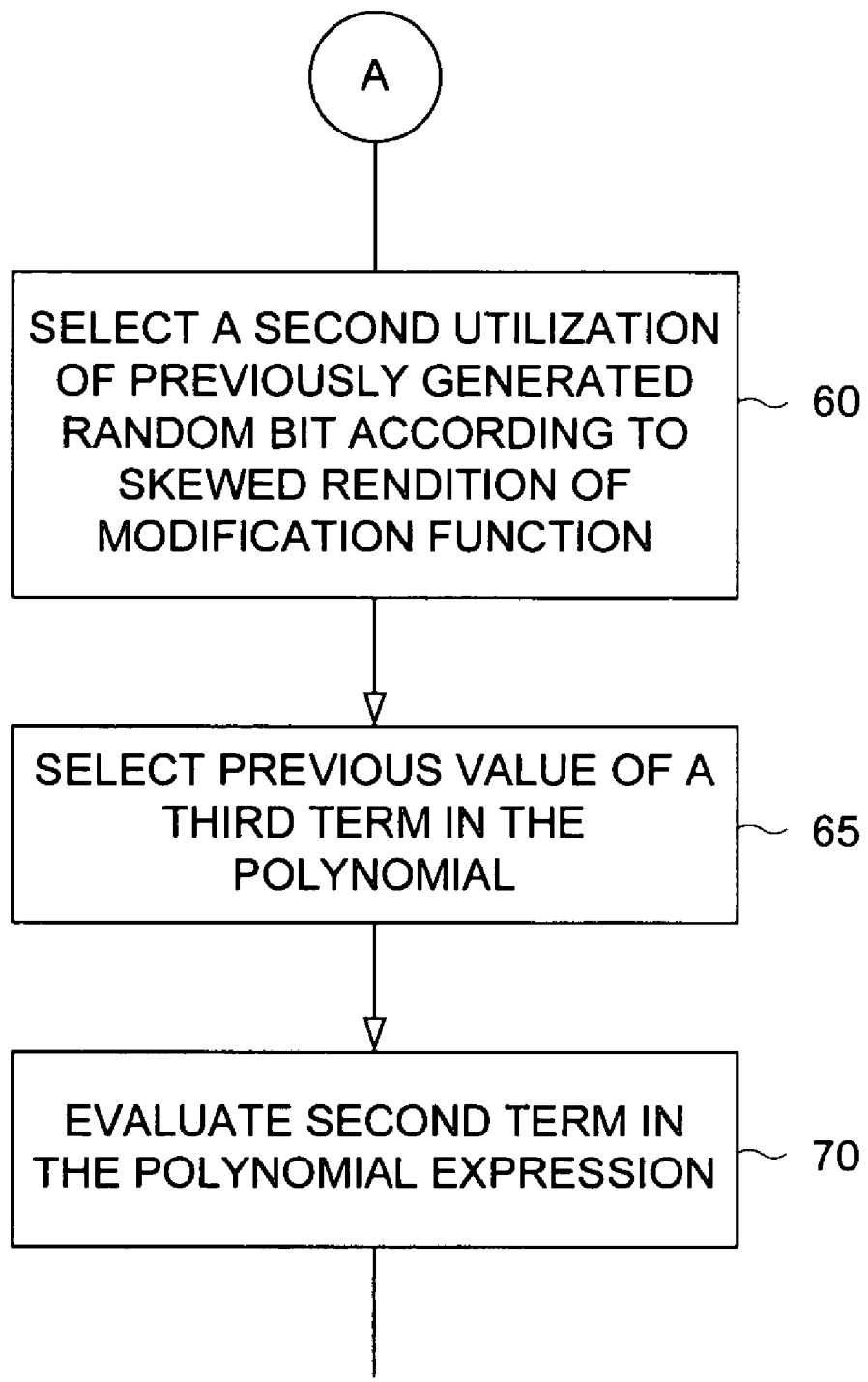
FIG. 4 is a flow diagram that depicts one alternative illustrative method for modifying a polynomial expression according to first and second utilizations of previously generated random bits.

FIG. 4 is a flow diagram that depicts one alternative illustrative method for modifying a polynomial expression according to first and second utilizations of previously generated random bits. According to this alternative method, the polynomial expression is modified by further selecting a second utilization of a previously generated random bit according to a skewed rendition of the modification function (step 60) and evaluating a second term in the polynomial expression (step 70) according to the second selected utilization and a previous value of a third term in the polynomial expression (step 65).

Figure 5:
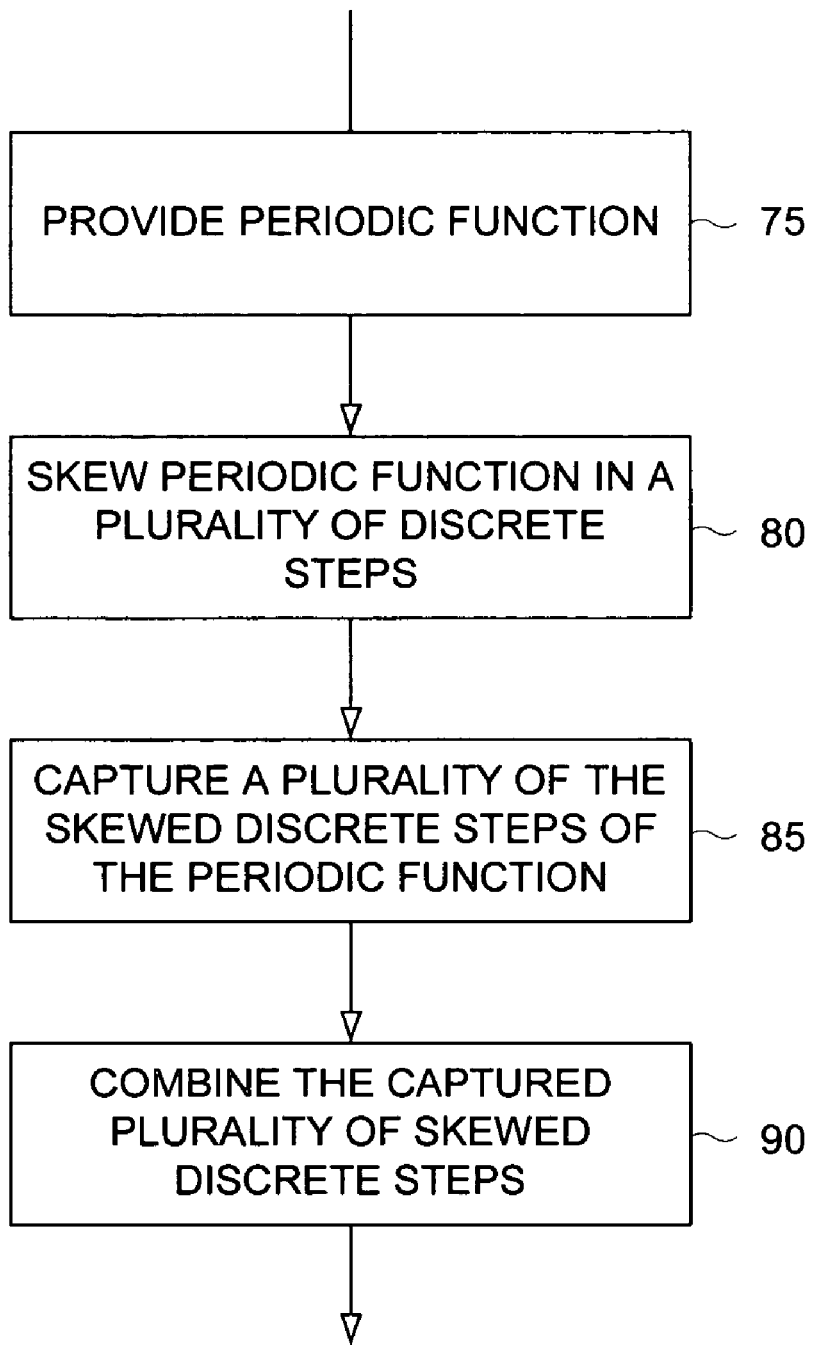
FIG. 5 is a flow diagram that depicts one alternative illustrative method for generating a random bit stream.

FIG. 5 is a flow diagram that depicts one alternative illustrative method for generating a random bit stream. According to this alternative method, a random bit is generated by providing a periodic function (step 75), skewing the periodic function in a plurality of discrete steps (step 80), capturing a plurality of the skewed discrete steps of the periodic function (step 85), and combining the captured plurality of skewed discrete steps (step 90).

Figure 6:
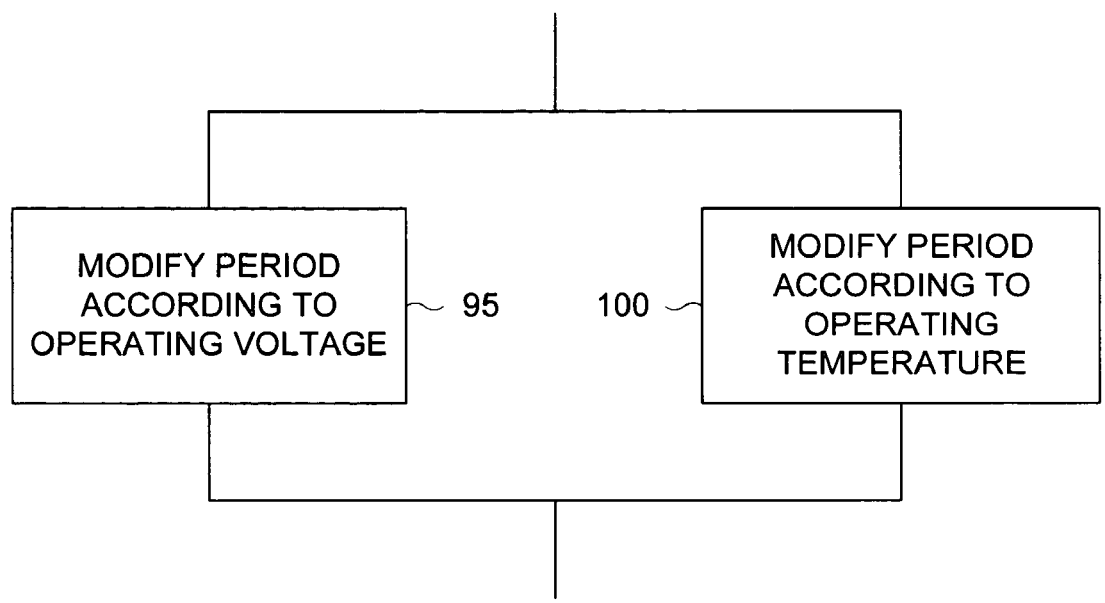
FIG. 6 is a flow diagram that depicts alternative illustrative methods for providing a periodic function.

FIG. 6 is a flow diagram that depicts alternative illustrative methods for providing a periodic function. According to this alternative method, a periodic function is provided by allowing a period of the periodic function to vary according to at least one of an operating voltage (step 95) and an operating temperature (step 100). By allowing the period to vary according to environmental factors such as operating voltage of an electronic circuit and the temperature at which it operates, entropy is introduced into the period of the periodic function.

Figure 7:
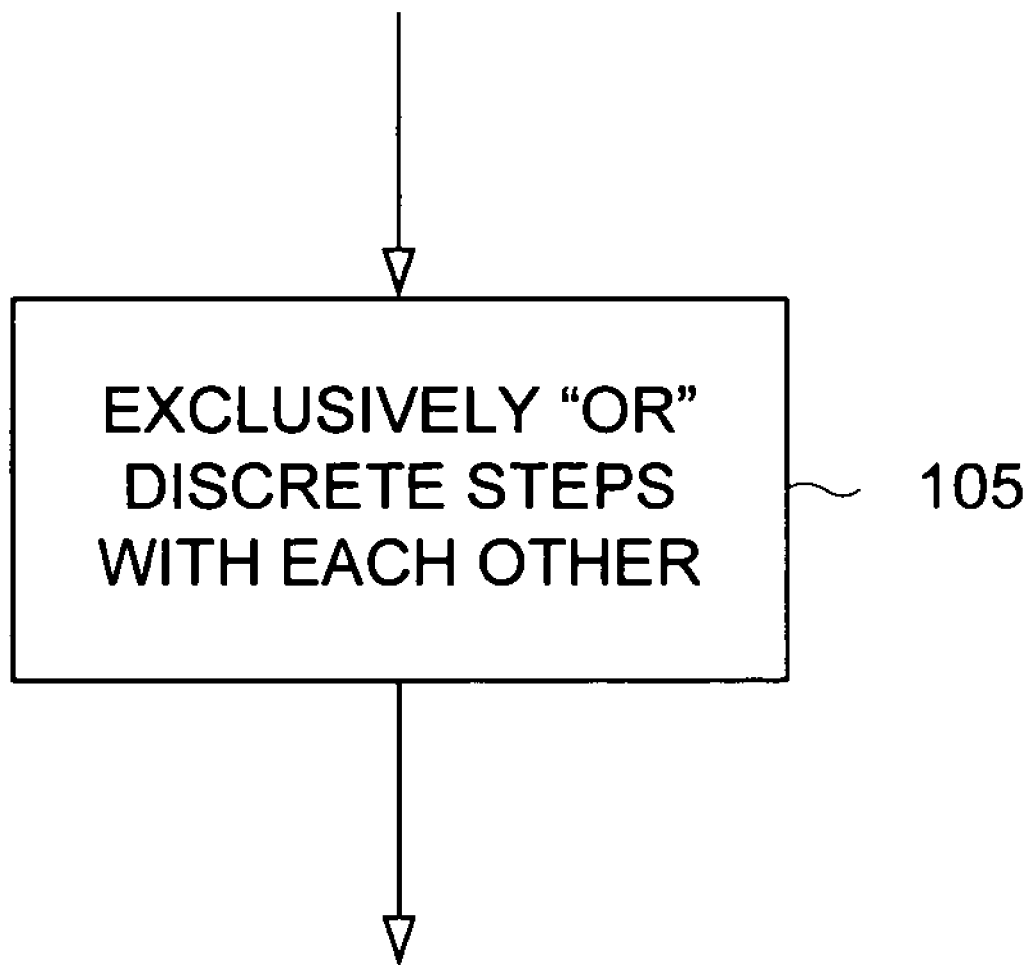
FIG. 7 is a flow diagram that depicts one alternative illustrative method for combining a captured plurality of skewed discrete steps of a periodic function.

FIG. 7 is a flow diagram that depicts one alternative illustrative method for combining a captured plurality of skewed discrete steps of a periodic function. According to this alternative method, a plurality of skewed discrete steps that are captured are combined by exclusively OR-ing individual, captured discrete steps of a periodic function with each other (step 105).

Figure 8:
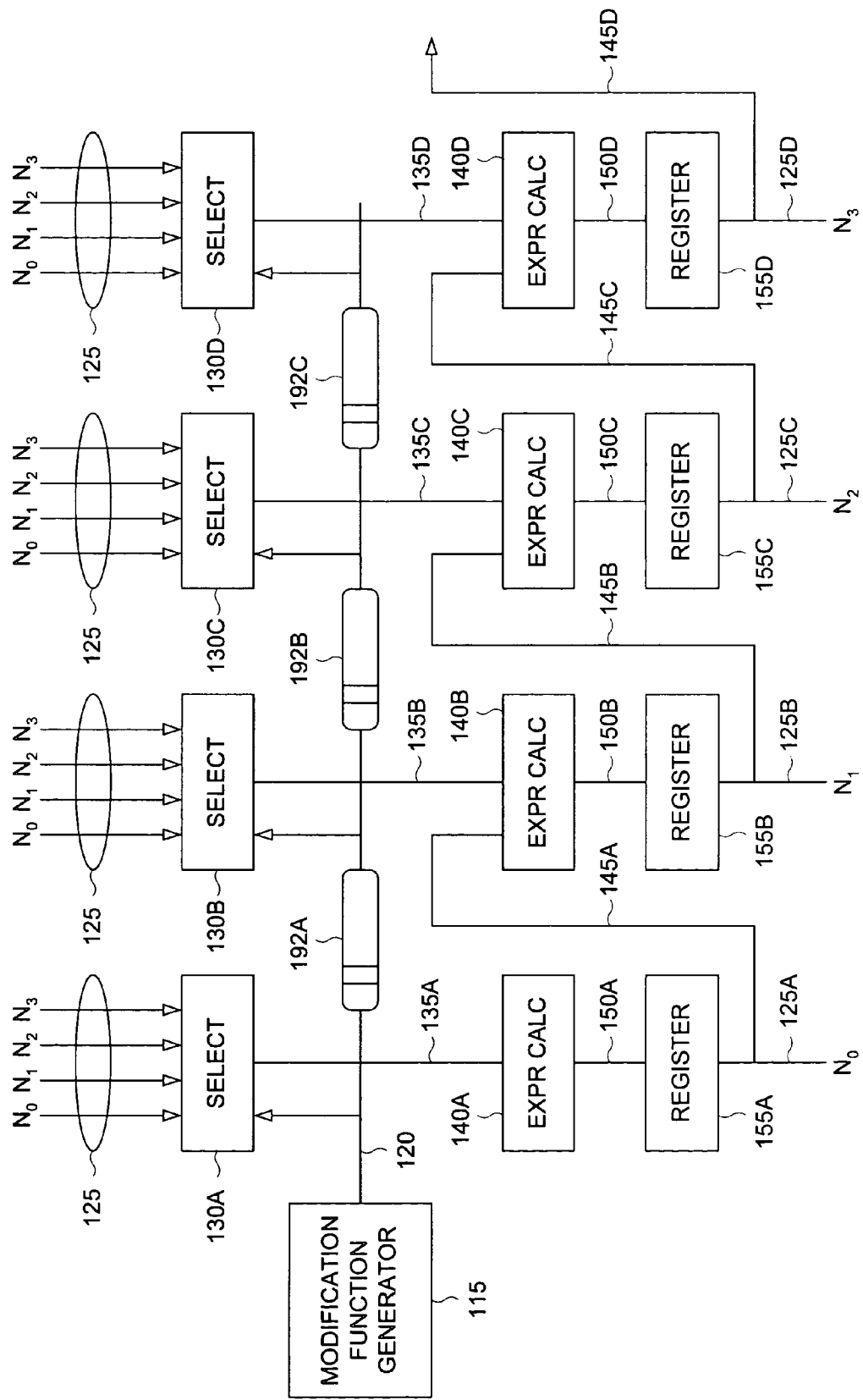
FIG. 8 is a block diagram that depicts one illustrative embodiment of a polynomial-based random bit generator.

FIG. 8 is a block diagram that depicts one illustrative embodiment of a polynomial-based random bit generator. According to this alternative illustrative embodiment, a random bit generator comprises a modification function generator 115 capable of generating a coefficient selection signal 120, a plurality of coefficient selectors 130a-d each capable of selecting a corresponding coefficient 135a-d for a particular term in a polynomial according to the coefficient selection signal 120. Further included in this embodiment are a plurality of expression calculators 140a-d each capable of generating a corresponding polynomial term 150a-d according to a corresponding preceding polynomial term 145a-d and a corresponding coefficient 135a-d generated by a corresponding one of the plurality of coefficient selectors 130a-d. Also included in this embodiment are a plurality of expression registers 155a-d each capable of capturing a corresponding generated polynomial term 150a-d wherein a random bit is selected as being an output 125a-d from one of the expression registers.

According to one alternative example embodiment, the modification function generator 115 produces a coefficient selection signal 120 which behaves essentially randomly and is input to a plurality of coefficient selectors 130a-d. The coefficient selectors 130a-d operate to perform a random selection of one of a plurality of previously stored polynomial terms (the outputs 125a-d of the capture registers 155a-d). A plurality of coefficients 135a-d are thus generated and presented to the plurality of corresponding expression calculators 140a-d. It should be appreciated the selection of a coefficient is random based on the random nature of the selection signal 120 in one alternative example embodiment. Each expression calculator 140a-d operates to perform a calculation according to one of the plurality of corresponding coefficients 135a-d and a corresponding preceding polynomial term 145a-d. The plurality of expression registers 155 function to store a plurality of corresponding highly random polynomial terms 150a-d generated by the corresponding expression calculators 140a-d. A random bit is obtained by selecting the output 125a-d of one of the expression registers 155a-d.

Figure 9:
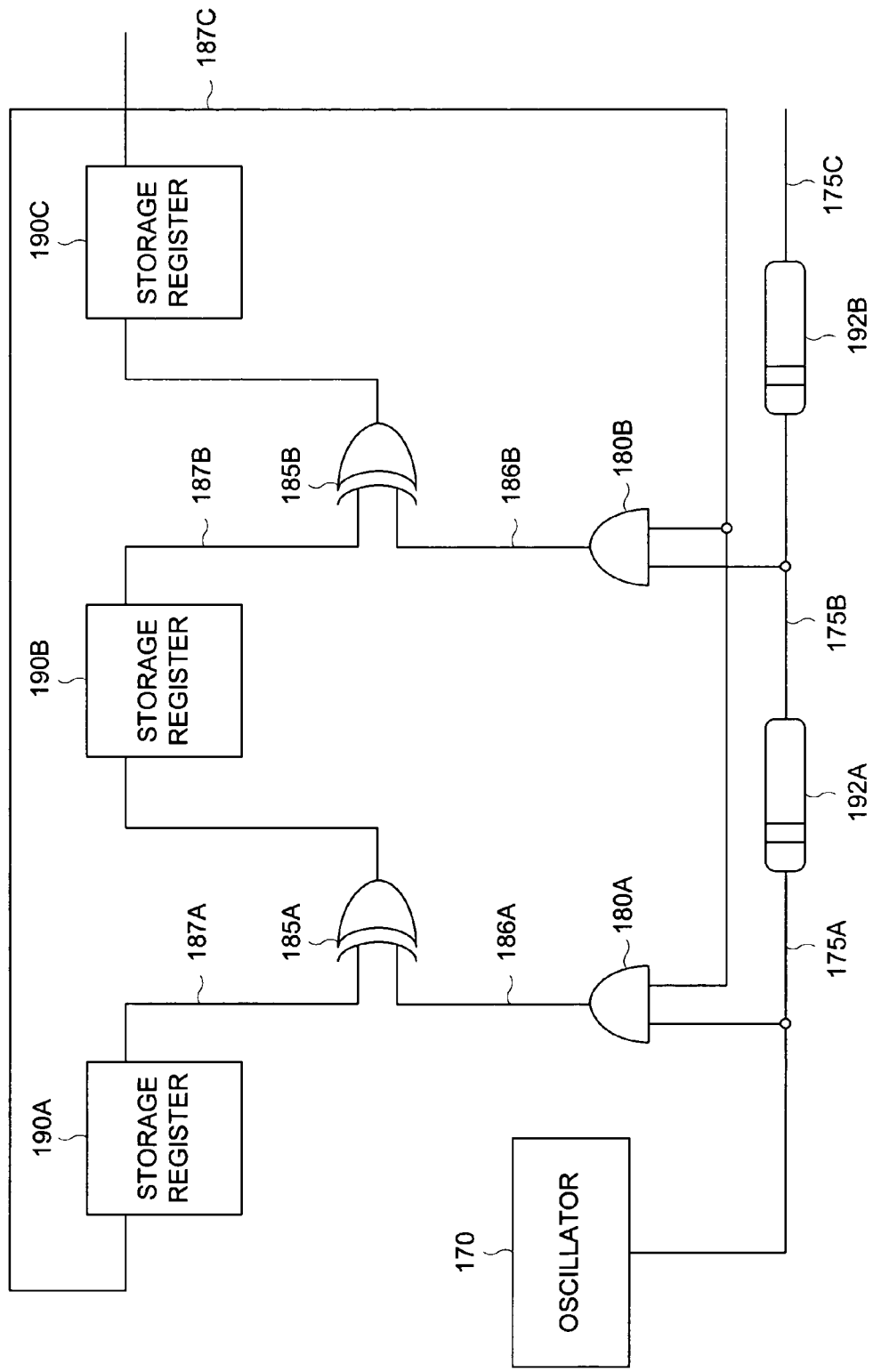
FIG. 9 is a block diagram that depicts an alternative illustrative embodiment of a polynomial-based random bit generator.

FIG. 9 is a block diagram that depicts an alternative illustrative embodiment of a polynomial-based random bit generator. According to this alternative embodiment, a random bit generator comprises an oscillator 170 and a plurality of storage registers 190a-c. The storage registers 190a-c are organized as a linear feedback shift register. All but the first register in the shift register have as an input the output of an expression calculator 185a-b in the form of an exclusive "or" gate, which is also included in this alternative example embodiment of a random bit generator. It should be appreciated that each storage register 190a-c is serviced by a corresponding expression calculator 185a-b, except for the first storage register in the linear feedback shift register. The first register in the linear feedback shift register is typically loaded with the value stored in the last register in the linear feedback shift register. An expression calculator 185a receives at least two inputs; a feedback term 186a and a preceding polynomial term 187a. The feedback term is selectively applied to one input of the expression calculator 185a according to a selection signal 175 which is generated by the oscillator 170.

FIG. 9 further illustrates that, according to one alternative embodiment, a random bit generator further includes one or more delay elements 192a-b. The one or more delay elements 192a-b are disposed in a cascade manner so as to form a multi-tap delay structure. In this alternative embodiment, the selection signal 175a is provided to the input of the first delay element such that a delayed rendition of the selection signal 175b is developed at the output of the first delay element 192a in the cascade structure. The output of the first delay element 192a is then directed to the second delay element 192b such that a further delayed rendition of the selection signal 175c is developed at the output of the second delay element. Each coefficient selector 180a-b then uses a corresponding delayed-rendition of the selection signal according to its position in the polynomial.

Figure 10:
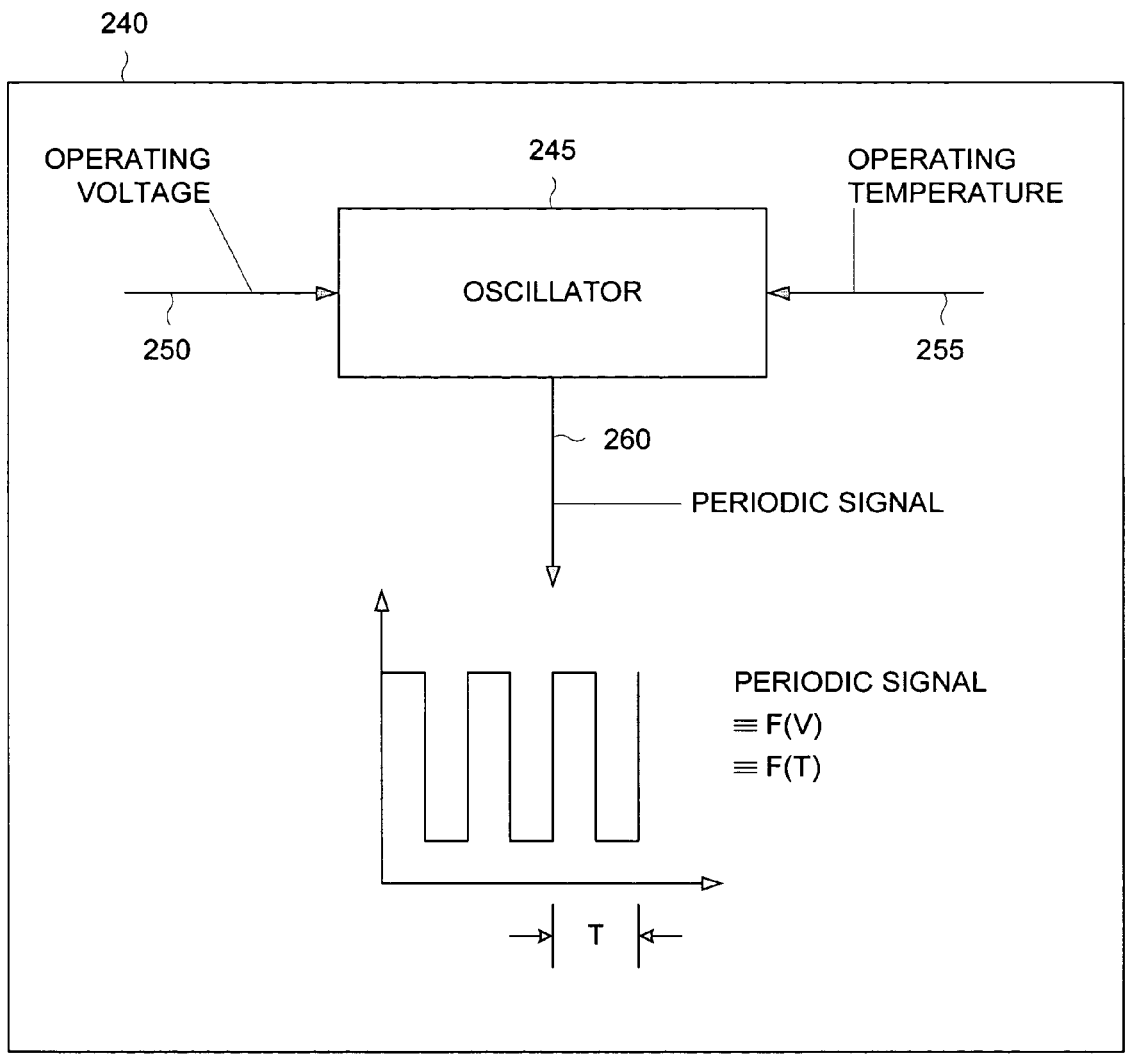
FIG. 10 is a block diagram that depicts an alternative illustrative embodiment of a modification function generator.

FIG. 10 is a block diagram that depicts an alternative illustrative embodiment of a modification function generator. According to this alternative embodiment, a modification function generator 240 comprises an oscillator 245. According to one alternative example embodiment, the oscillator 245 produces a periodic signal 260 whose frequency varies according to the level of voltage applied to the oscillator 245 as operating power. According to another alternative example embodiment, a periodic signal 260 generated by the oscillator 245 varies according to the temperature of its ambient environment 255.

Figure 11:
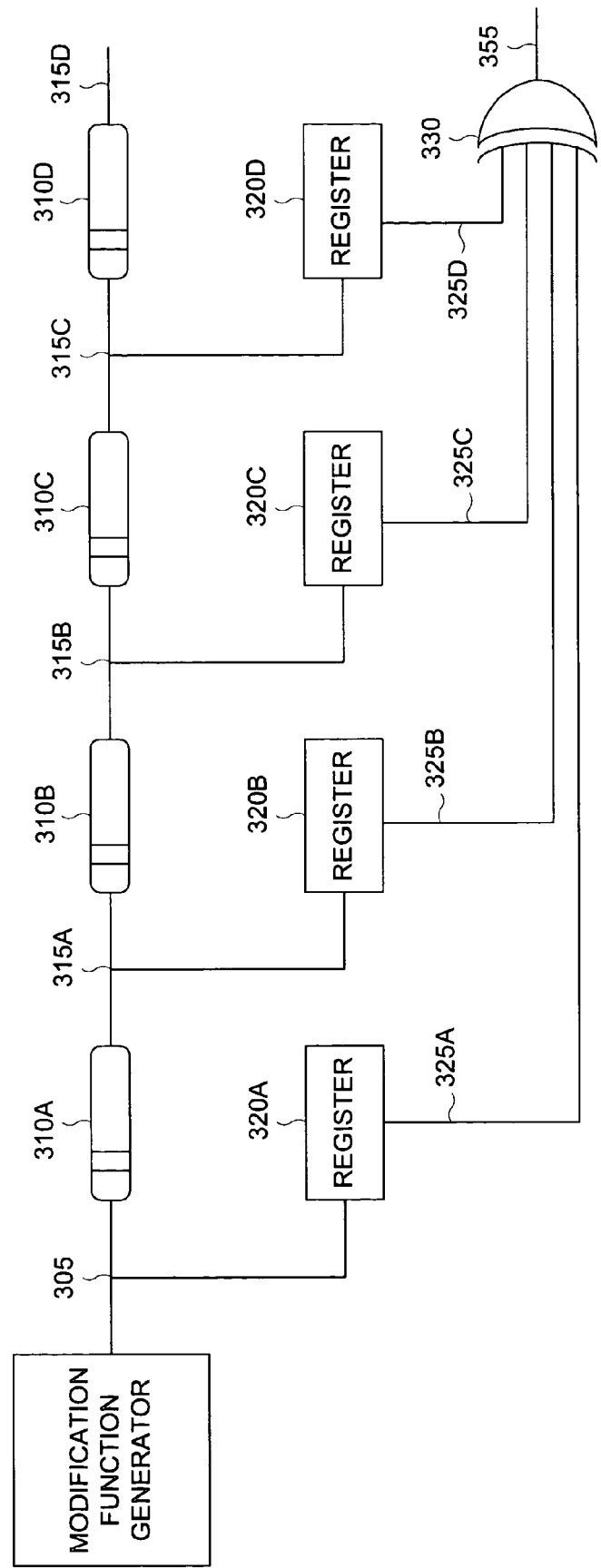
FIG. 11 is a block diagram that depicts an alternative illustrative embodiment of a random bit generator.

FIG. 11 is a block diagram that depicts an alternative illustrative embodiment of a random bit generator. According to this alternative embodiment, a random bit generator comprises a modification function generator 300 capable of generating a coefficient selection signal 305, a plurality of delay elements 310a-d disposed in cascade so as to delay the coefficient selection signal 305 in a plurality of corresponding discrete steps 315a-d, a plurality of capture registers 320a-d capable of capturing a value of a delayed coefficient selection signal 305 at a corresponding discrete delay step, and a combiner 330 capable of combining a plurality of values 325a-d captured by the corresponding capture registers 320a-d. According to yet another alternative example embodiment, the modification function generator 300 produces a periodic signal that is sensitive to variations in at least one of an operating voltage and an operating temperature, as described supra. The coefficient selection signal 305 is input to a plurality of delay elements 310a-d. The delay elements 310a-d each operate to induce a random delay on the coefficient selection signal 305 in discrete steps due to its position relative to a previous delay element. It should also be appreciated that each of the delay elements 310a-d will exhibit a random difference in the amount of delay they introduce, resulting from manufacturing process variations and sensitivities to at least one of operating voltage and operating temperature.

While the present method and system have been described in terms of several alternative methods and embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for generating random bit stream comprising:
   generating a random bit using data processing hardware according to a polynomial expression stored in data memory;
   providing a periodic function;
   allowing a period exhibited by the periodic function to vary according to at least one of an operating voltage and an operating temperature; and
   modifying the polynomial expression according to the periodic function.

2. The method of claim 1 further comprising skewing the periodic function according to a pre-defined term in the polynomial expression.

3. The method of claim 1 wherein modifying the polynomial expression comprises:
   selecting a first utilization of a previously generated random bit according to a modification function; and
   evaluating a first term in the polynomial expression according to the first selected utilization and a previous value of a second term in the polynomial expression.

4. The method of claim 3 further comprising capturing the evaluation substantially contemporaneously with selection of the first utilization.

5. The method of claim 3 further comprising:
   selecting a second utilization of the previously generated random bit according to a skewed rendition of the modification function; and
   evaluating a second term in the polynomial expression according to the second selected utilization and a previous value of a third term in the polynomial expression.

6. A method for generating random bit stream comprising:
   generating a random bit using data processing hardware according to a polynomial expression stored in data memory;
   providing a modification function;
   selecting a first utilization of a previously generated random bit according to a modification function; and
   evaluating a first term in the polynomial expression according to the first selected utilization and a previous value of a second term in the polynomial expression.

7. The method of claim 6 wherein providing a modification function comprises:
   providing a periodic function; and
   allowing a period exhibited by the periodic function to vary according to at least one of an operating voltage and an operating temperature.

8. The method of claim 7 further comprising skewing the periodic function according to a pre-defined term in the polynomial expression.

9. The method of claim 6 further comprising capturing the evaluation substantially contemporaneously with selection of the first utilization.

10. The method of claim 6 further comprising selecting a second utilization of the previously generated random bit according to a skewed rendition of the modification function.

11. The method of claim 10 further comprising evaluating a second term in the polynomial expression according to the second selected utilization and a previous value of a third term in the polynomial expression.

12. A method for generating random bit stream comprising:
   generating a random bit according to a polynomial expression stored in data memory;
   providing a modification function for coefficients of the polynomial expression; and
   modifying the polynomial expression according to the modification function.

13. The method of claim 12 wherein providing a modification function comprises providing a periodic function.

14. The method of claim 13 further comprising allowing a period exhibited by the periodic function to vary according to at least one of an operating voltage and an operating temperature.

15. The method of claim 13 further comprising skewing the periodic function according to a pre-defined term in the polynomial expression.

16. The method of claim 12 wherein modifying the polynomial expression comprises selecting a first utilization of a previously generated random bit according to the modification function.

17. The method of claim 16 further comprising evaluating a first term in the polynomial expression according to the first selected utilization and a previous value of a second term in the polynomial expression.

18. The method of claim 17 further comprising capturing the evaluation substantially contemporaneously with selection of the first utilization.

19. The method of claim 17 further comprising selecting a second utilization of the previously generated random bit according to a skewed rendition of the modification function.

20. The method of claim 19 further comprising evaluating a second term in the polynomial expression according to the second selected utilization and a previous value of a third term in the polynomial expression.

* * * * *

UNITED STATES PATENT AND TRADEMARK OFFICE
CERTIFICATE OF CORRECTION

PATENT NO. : 7,590,674 B2  Page 1 of 1
APPLICATION NO. : 11/173329
DATED : September 15, 2009
INVENTOR(S) : Mark E. Miller It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Twenty-first Day of September, 2010

David J. Kappos
*Director of the United States Patent and Trademark Office*